United States Patent [19]

James et al.

[11] 4,118,365

[45] Oct. 3, 1978

[54] MOULDING THERMOSETTING COMPOSITIONS

[75] Inventors: Harold James, Hanbury; Martin Buggy, Stourbridge, both of England

[73] Assignee: British Industrial Plastics Limited, Manchester, England

[21] Appl. No.: 774,494

[22] Filed: Mar. 4, 1977

[30] Foreign Application Priority Data

Mar. 10, 1976 [GB] United Kingdom .............. 09646/76

[51] Int. Cl.² ................................................ C08J 5/02
[52] U.S. Cl. ................................... 260/39 R; 264/211
[58] Field of Search ............... 260/38, 39 R; 264/211

[56] References Cited

U.S. PATENT DOCUMENTS

| | | | |
|---|---|---|---|
| 3,651,187 | 3/1972 | Cessna | 264/211 X |
| 3,894,981 | 7/1975 | Kruglikon et al. | 260/38 X |
| 3,917,555 | 11/1975 | Worschek et al. | 260/38 X |
| 4,009,043 | 2/1977 | Preis | 260/38 X |

*Primary Examiner*—Sandra M. Person
*Attorney, Agent, or Firm*—Cushman, Darby & Cushman

[57] ABSTRACT

A method of producing moulded plastics articles by a continuous moulding or extrusion operation which comprises providing in a screw machine a blend of filler and the precursors of a synthetic thermosetting material and operating the screw machine to (a) intimately mix the filler and the precursors or an uncured condensate thereof and plasticize the mixture and (b) convey the intimate mixture directly to a mould or extrusion head. The mixture is cured after being conveyed to the mould or extrusion head.

12 Claims, No Drawings

MOULDING THERMOSETTING COMPOSITIONS

This invention concerns improvements in or relating to the moulding of thermosetting moulding compositions.

In our co-pending patent application Ser. No. 630,174, filed Nov. 10, 1975 is described and claimed a method by which cured thermoset plastics artefacts (including extrusions) are made directly from a non-homogeneous blend of a filler and a solid particulate thermosetting material, by use of a screw injection moulding machine (or screw extruder) which is operated to cause the non-homogeneous blend to plasticize or flux so that a homogeneous intimate mixture of the filler and the thermosetting material is formed in the barrel of the machine. The solid particulate thermosetting material is produced in a separate process and is delivered as such to the machine.

According to the present invention, we provide a method of producing moulded synthetic plastics artefacts by a continuous moulding or extrusion sequence which comprises:
  (a) providing in a screw injection moulding machine or screw extruder (each being referred to hereafter for convenience as a screw machine) a blend of a filler, and the precursors of a synthetic thermosetting material and optionally a condensation catalyst;
  (b) operating the screw machine so that
    (i) the filler and the precursors or an uncured condensate thereof become intimately mixed, and plasticized and
    (ii) the resultant intimate mixture is conveyed directly to a mould or extrusion head, and
  (c) curing the intimate mixture after conveying to the mould or extrusion head.

Depending on the operating conditions of the screw machine and on the type of precursors used, the precursors may partially condense to form an uncured condensate.

By the term "the precursors," we mean two or more compounds which react together to form the synthetic thermosetting material. Suitable example are urea, melamine (para) formaldehyde, dimethylol urea, as used in the production of aminoplast resins; phenol, (para) formaldehyde, and other compounds as used in the production of phenolic resins.

Additionally, modifying compounds which can be used in conjunction with aminoplast resins, or phenolic resins, such as alkyds, diallyl phthalate, styrene, or epoxides, may be included with the foregoing precursors.

The blend may also comprise any of the usual additives for thermosetting resin-based moulding materials, for example lubricant, stabiliser, catalyst and pigment. The inclusion of a plasticizer is highly preferred.

Any volatile non-reacting liquid such as water used initially in the blend is preferably vented from the barrel of the screw machine. Since the synthetic thermosetting materials produced in the process are of the condensation type, water or other volatile substance may be evolved during any condensation which may occur under the action of heat as the filler and the precursors are progressed through the barrel of the screw machine. Accordingly, the barrel is preferably vented.

The incompletely condensed (or non-condensed) material which issues from the downstream end of the barrel of the screw machine is mouled immediately by direct injection into a mould (or by the so-called injection compression technique) or by passing it directly into a heated extrusion head, and is thereby cured.

The blend may be provided in the screw machine by one of several alternative methods, e.g:
  (1) by mixing the filler with the precursors in a mixer or blender and transferring the mixture to the hopper of the screw machine; or
  (2) by introducing the filler and precursors to the hopper and mixing them together in the hopper, or
  (3) providing the filler in one hopper, and the precursor in another hopper and feeding these materials separately to the interior of the barrel of the screw machine so that the blend is formed in the barrel.

A catalyst or modifying compound may be separately injected into the barrel, nozzle, or extrusion head.

The injection moulding machine or extruder preferably has a single screw. The starting materials are preferably used in a finely divided form to facilitate intimate mixing, for example all passing 30 mesh (BS). When using such materials we have found that it may be necessary to use a machine having a means to assist the feed along the barrel, for example, a screw lensing (barrel) suitably grooved internally. In general the finer the division of the starting material, the greater the likelihood of such assistance being required, although the nature of the materials themselves can also be an influencing factor, for example, materials containing powdered cellulose are difficult to feed. It is also desirable to provide a means to ensure a uniform feed into the barrel such as an agitated hopper.

Suitable fillers include powdered cellulose, woodflour, talc, $CaCO_3$, powdered glass, and the like, and the cured particulate aminoplast materials described in our U.K. Patent Specifications Nos. 1,422,158 and 1,424,204.

Optionally or additionally fibrous materials, such as glass fibre, asbestos fibres or carbon fibres, may be used.

The following examples illustrate some preferred embodiments of the invention.

EXAMPLES 1 to 4

A BIPEL 155/50 injection moulding machine (BIPEL is a Registered Trade Mark) was used, with two modifications:
  (a) the standard barrel (screw housing) was replaced by one having longitudinal grooving, circumferentially spaced around the interior wall of the barrel and extending through substantially the whole length of the barrel as described in German Offenlegungschrift 2514307; U.S. Pat. No. 4,013,276 and
  (b) the feed hopper was provided with an agitator to effect continuous agitation of the contents of the hopper.

For the following formulations (Table 1), all the solid ingredients were in finely divided form, passing 30 mesh and were charged to a Baker-Perkins Z — blade mixer, before blending commenced, and mixing was effected, from 10 to 30 minutes to produce a blend of the precursors, the filler, and the other ingredients. The 'rough' blend thus produced was fed to the hopper of the machine; the machine was then operated to agitate the contents of the hopper, feed them to the barrel, compound the blend in the barrel, and to produce test specimen mouldings.

The operating conditions of the machine are shown in Table II. In each case, a pin-gated bar of dimensions about 6 × 1 × 0.14 inches (15mm × 2.5mm × 0.35mm)

was produced. These bars were subjected to standard mechanical and physical testing, the results of which are shown in Table II, by the methods of BS 2782 normally used.

The operating conditions of the injection moulding machine (or of an extruder) can be selected readily by those skilled in the art. For machines of the general type used as described above, the general conditions are:

Barrel temperature 50° to 150° C.
Mould temperature 120°–200° C.
Injection pressure 1,000–35,000 p.s.i.
Total cycle time 10–250 seconds The more preferable are:

Barrel temperature 80° to 110° C.
Mould temperature 140° to 170° C.
Injection pressure up to 20000 p.s.i.
Total cycle time 15 to 130 seconds These may be selected as appropriate depending on the materials and the machine being used and the type of mouldings to be produced. An extruder will, of course, be provided with an extruder head capable of being heated to a temperature sufficiently high to cure material passing through it.

In general, the properties of the mouldings equate reasonably well with those of mouldings produced from moulding materials of equivalent composition made by standard methods. The main advantage of the invention is that, by use of the techniques disclosed herein, it is possible to produce commercially acceptable injection or extrusion mouldings of thermoset resinous material without resort to the costly and time-consuming processes for producing pre-compounded moulding materials.

TABLE I

| Ex. | Ingredient | Parts by weight | |
|---|---|---|---|
| 1. | Dimethyl urea | 1300 | Resin precursors |
|  | Powdered urea | 130 |  |
|  | Powdered Cellulose | 422 | Filler |
|  | BaSO$_4$ | 123 |  |
|  | Phthalic Anhydride | 2 | Catalyst |
|  | Lubricant | 9 | Additives |
|  | Hasticizer | 100 |  |
| 2. | Melamine | 500 | Resin precursors |
|  | Powdered urea | 1000 |  |
|  | 82% paraformaldehyde | 1000 |  |
|  | Powdered Cellulose | 1500 | Filler |
|  | BaSO$_4$ | 500 |  |
|  | Lubricant | 50 | Additives |
|  | Plasticizer | 200 |  |
| 3. | Melamine | 1000 | Resin Precursors |
|  | 82% Paraformaldehyde | 566 |  |
|  | Woodflour | 514 | Filler |
|  | Lubricant | 12 | Additives |
|  | Plasticizer | 120 |  |
| 4. | Melamine | 250 | Resin Precursors |
|  | Powdered urea | 500 |  |
|  | Paraform | 500 |  |
|  | Powdered Cellulose | 500 | Filler |
|  | UF filler | 500 |  |
|  | Lubricant | 25 | Additives |
|  | Masticizer | 100 |  |

TABLE II

| Example | | 1 | 2 | 3 | 4 |
|---|---|---|---|---|---|
| Barrel Temp° C | | 95 | 95 | 95 | 95 |
| Mould Temp° C | | 150 | 165 | 165 | 165 |
| Injection Pressure | High (psi) | 20000 | 20000 | 20000 | 20000 |
|  | Low (psi) | 8000 | 8000 | 8000 | 8000 |

TABLE II-continued

| Example | 1 | 2 | 3 | 4 |
|---|---|---|---|---|
| Injection Timer (secs) | 10 | 10 | 10 | 5 |
| Cycle Timer (secs) | 40 | 30 | 30 | 30 |
| Screwback (inches) | 1.25 | 1.50 | 2.00 | 2.00 |

TABLE III

| Example | 1 | 2 | 3 | 4 |
|---|---|---|---|---|
| Flexural Strength (MN/m$^2$) | 63 | 69 | 50 | 50 |
| Flexural Modulus (GN/m$^2$) | 2.7 | 4.8 | 4.5 | 3.1 |
| Energy to Break (KJ/m$^3$) | 735 | 497 | 278 | 403 |
| Deflection at Break (mm) | 2.33 | 1.4 | 1.1 | 1.61 |
| Boiling water absorption (mg/g) | 23 | 42 | 26 | 49 |
| Insulation Resistance (ohms × 10$^9$) | 2.3 | 6.3 | 7.9 | 82* |

*8.2 × 10$^{10}$

We claim:

1. A method of producing moulded synthetic plastics artefacts by a continuous moulding sequence which comprises the successive steps of:
   (a) providing in an injection moulding machine including a reciprocating rotary screw in a barrel, a blend of materials comprising a filler, and the solid precursors of a synthetic amino-formaldehyde thermosetting material and optionally a condensation catalyst;
   (b) intimately mixing said materials, reacting said precursors and compounding with said filler in the barrel of the machine,
   (c) injecting the resultant material directly into a heated mould, and
   (d) curing the material in the mould.

2. A method according to claim 1 in which the precursors include at least one of urea, melamine, formaldehyde, paraformaldehyde and dimethylol urea.

3. A method according to claim 1 in which at least one modifying compound selected from the group consisting of alkyds, diallyl phthalate, styrene and epoxides, of a kind which can be used with the synthetic thermosetting material being produced, is included with the precursors.

4. A method according to claim 1 in which the blend comprises also at least one additive for the synthetic thermosetting material selected from lubricants, stabilizers, catalysts and pigments.

5. A method according to claim 1 in which the blend comprises a plasticizer for the synthetic thermosetting material.

6. A method according to claim 1 in which the blend is provided in the injection molding by feeding a premix of its ingredients into the machine.

7. A method according to claim 1 in which the blend is formed within the injection molding, at least two ingredients of the blend being fed separately into the machine.

8. A method according to claim 1 in which a catalyst of modifying compound selected from the group consisting of alkyds, diallyl phthalate, styrene and epoxides, is injected independently into the screw machine.

9. A method according to claim 1 in which the injection molding has a single screw.

10. A method according to claim 9 in which the screw is located in a barrel which is grooved internally in a direction parallel to the rotational axis of the screw.

11. A method of producing molded synthetic plastics artefacts by a continuous molding sequence which comprises the successive steps of:

(a) providing in an injection molding machine including a reciprocating rotary screw in a barrel, a blend of materials comprising a filler, and the solid precursors of a synthetic amino-formaldehyde thermosetting material wherein said solid precursors include at least one of urea, melamine, paraformaldehyde and dimethylol urea and optionally a condensation catalyst;

(b) intimately mixing said materials, reacting said precursors and compounding with said filler in the barrel of the machine, (c) injecting the resultant material directly into a heated mold and (d) curing the material in the mold.

12. The method of injection molding amino-formaldehyde thermosetting material to produce a cured artefact having filler homogeneously dispersed therewith without requiring the preliminary step of resin manufacture and compounding a molding powder having the filler already homogeneously dispersed therein, which comprises the steps of:

(a) providing the solid precursors of a synthetic thermosetting amino-formaldehyde material, said precursors being two or more solid compounds including at least one amono compound and at least one formaldehyde compound which react together to form said thermosetting material;

(b) introducing said precursors, filler and optionally a condensation catalyst in at best a rough, non-homogeneous blend directly into the barrel of an injection molding machine, said machine having a heated barrel and a rotary screw which is axially movable in said barrel;

(c) rotating said screw simultaneously to feed the blend along the barrel, intimately mixing said materials, react said precursors to form a thermosetting material, plasticize the thermosetting material and impregnate the filler with the plasticized material, to provide a homogeneous blend and effect transfer of homogeneous blend ahead of the screw by screw-back of the screw;

(d) injecting homogeneous blend from ahead of the screw into a heated mold; and (e) curing the artefact in the mold.

* * * * *